(12) United States Patent
Dun et al.

(10) Patent No.: US 7,020,801 B2
(45) Date of Patent: Mar. 28, 2006

(54) SYSTEMS AND METHODS FOR ANALYZING BUS DATA

(75) Inventors: John Charles Dun, Issaquah, WA (US); Kenneth D. Ray, Seattle, WA (US); Glen Thomas Slick, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 10/164,441

(22) Filed: Jun. 6, 2002

(65) Prior Publication Data
US 2003/0229827 A1 Dec. 11, 2003

(51) Int. Cl.
*G06F 11/00* (2006.01)

(52) U.S. Cl. ............................................ 714/39; 714/44
(58) Field of Classification Search .................. 714/39, 714/44, 45
See application file for complete search history.

(56) References Cited

U.S. PATENT DOCUMENTS

| 6,389,560 | B1 * | 5/2002 | Chew | 714/43 |
| 2003/0046666 | A1 * | 3/2003 | Siebert et al. | 717/127 |

* cited by examiner

*Primary Examiner*—Bryce Bonzo
(74) *Attorney, Agent, or Firm*—Workman Nydegger

(57) ABSTRACT

Systems and methods for analyzing transactions on a bus. A software module can cause a trace packet to be generated and sent out on a bus to an invalid address. The trace packet triggers a protocol analyzer and permits the bus data flowing on the bus when the software module detected a problem to be analyzed. The trace packet causes the protocol analyzer to trigger even though the bus protocol is normal and the protocol analyzer would not otherwise trigger. The trace packet can be used to analyze and debug communications flowing on a bus when the software module detects a problem.

25 Claims, 3 Drawing Sheets

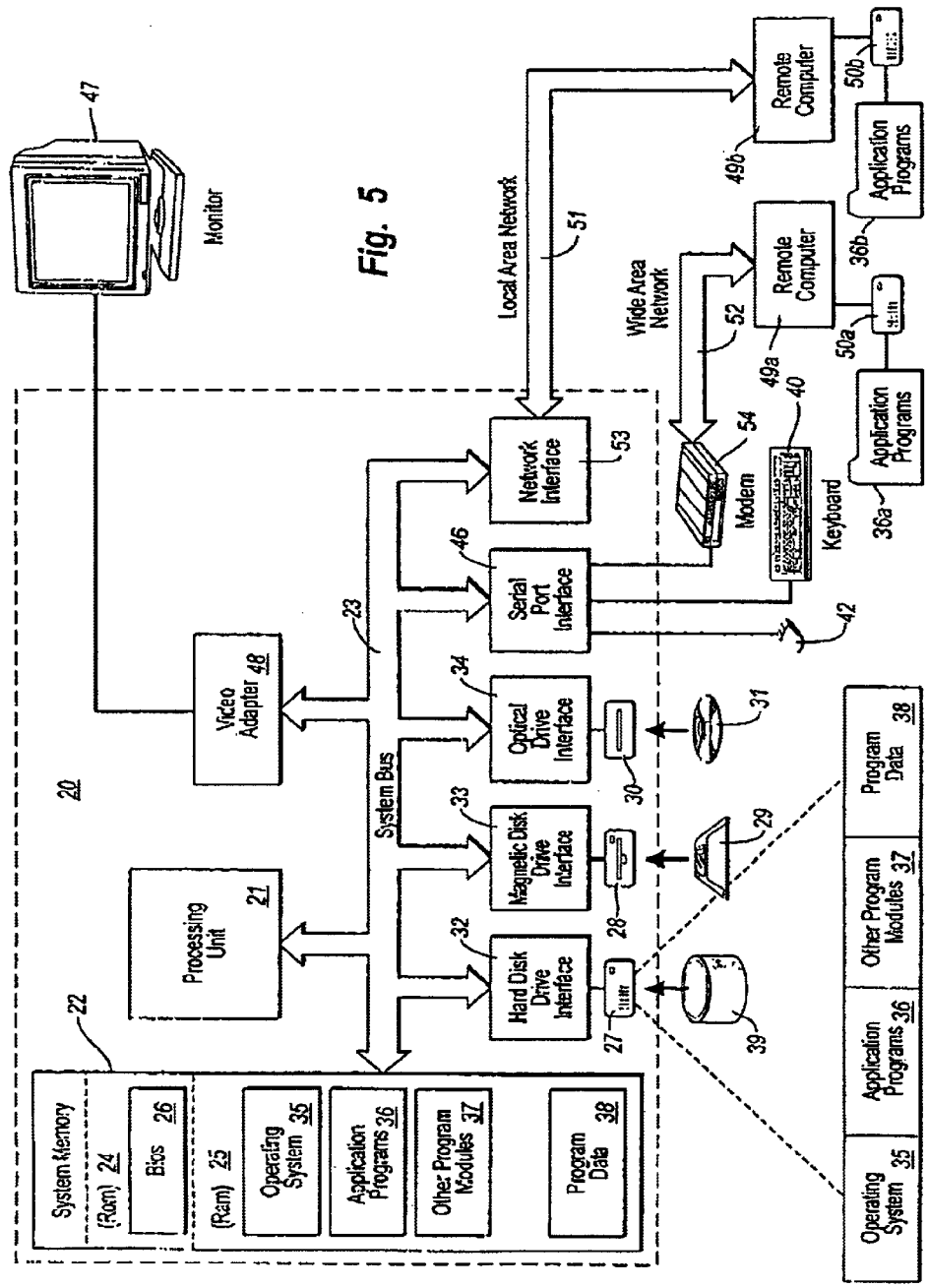

SYSTEMS AND METHODS FOR ANALYZING BUS DATA

BACKGROUND OF THE INVENTION

1. The Field of the Invention

The present invention relates to analyzing bus traffic or data. The present invention relates to systems and methods for analyzing bus data or traffic using a trace packet, and more particularly to systems and methods for analyzing serial bus data using a trace packet that can be generated by more than one software module or device driver.

2. Background and Relevant Art

One of the primary advantages of the protocols such as Universal Serial Bus (USB) and IEEE 1394 is the ability able to handle a high data transfer rate. USB 1.1, for example, supports data transfer speeds up to 12 Megabits per second, while USB 2.0 supports data transfer rates up to 480 Megabits per second. Another advantage of the USB protocol is the ability to support 127 devices from a single USB port. In addition, USB also simplifies the connection of external devices.

Simply stated, these serial bus protocols enable increased data transfer speeds between devices. In any system, however, there are various problems that can occur between devices and their hosts. One of the ways that these problems are resolved is through the use of protocol analyzers. Protocol analyzers are able to monitor the bus to which they are connected and alert users to abnormal bus or protocol conditions.

One of the problems encountered with serial bus protocols is that the lower level protocols for transferring the data are becoming independent of the upper level protocols that the devices use on top of these bus protocols. USB, for example, allows generic access to multiple devices. Consequently, the bus traffic will reflect simple protocols that are independent of the devices and their higher level protocols that use the lower level bus protocols. As a result, it is now more difficult to discover specific protocol transition points or other problems.

Protocol analyzers can help overcome these types of problems by providing a snapshot of the bus traffic that was present around the time that the problems occurred. In other words, protocol analyzers can read packets from the serial bus and store the packets in a file or cache for further analysis. The packets can be extracted at a later time and/or filtered using various parameters or characteristics such as packet type.

Protocol analyzers can be programmed to trigger on certain events. Protocol analyzers snoop packets that are transmitted on the serial bus looking for those events as well as other abnormal conditions or events. When one of those events is detected, the protocol analyzer triggers and captures all data on the bus. The captured data is typically stored in a large cache that can be dumped to a file. Depending on the trigger event, the protocol analyzer may simply stop recording data on the bus. In this situation, the cache will store information that was on the bus prior to the trigger event. Alternatively, the trigger can be set such that the cache is filled with data that occurred after the trigger event. Finally, the trigger can be set such that the cache contains some combination of data that was on the bus both before and after the trigger event.

While the ability to program a trigger event is useful, it is sometimes difficult to program the protocol analyzer to trigger on unknown problems. For example, a problem may occur with a device even though the protocol is operating in a normal fashion. In other words, it is very difficult to cause the protocol analyzer to trigger when the software determines that there is a problem with a device or in the communication with a device because there may be nothing abnormal with respect to the protocol. Thus, the protocol analyzer does not trigger and the communication between the host and the device that existed at the time the problem was initially detected is difficult to ascertain and may not be captured. For this reason, random problems and other unexplained failures are difficult to analyze using protocol analyzers because they do not trigger the protocol analyzer and the data or traffic on the bus cannot be analyzed because it was not captured.

BRIEF SUMMARY OF THE INVENTION

These and other limitations are overcome by the present invention which relates to serial bus analysis and to systems and methods for analyzing serial bus data. Protocol analyzers are used to further understand the communications of various bus protocols. As data is flowing on a bus, the protocol analyzer can examine the bus data. If necessary, the protocol analyzer can store the data flowing on the bus in a file for further analysis.

Most often, however, protocol analyzers are used to capture data that is present on the bus when certain conditions are met. For example, the protocol analyzer can examine the data by searching for a data packet that has a certain characteristic in a packet field or in the packet data. When found, the protocol analyzer triggers and captures the data on the bus.

The present invention enables software modules to trigger the protocol analyzer. More particularly, the software modules can trigger the protocol analyzer even when there is nothing on the bus that would otherwise trigger the protocol analyzer. When a software module detects an error or problem with its specific device, the software module can trigger the protocol analyzer. The software module can cause a trace packet to be sent over the bus to an invalid address. By sending the trace packet to an invalid address, the trace packet is ignored by other devices on the bus, but the trace packet will trigger the protocol analyzer because it has previously been identified to the protocol analyzer. The present invention permits software modules to cause a trace packet to be placed on the bus at any time for various reasons. A trace packet can be placed on the bus when an error is detected, when a certain state is present, or for any other transition.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates an exemplary environment for implementing one embodiment of the present invention.

DETAILED DESCRIPTION OF THE PREFERRED EMBODIMENTS

Protocol analyzers are used on serial busses to capture the traffic, data, or transactions that occur on those busses. The protocol analyzers can parse the data as it is flowing on the bus looking for special events. These events enable the protocol analyzers to capture specific portions of the bus data. The captured data can be more fully examined in context.

The present invention allows software modules to place a trace packet on the bus such that the event or condition associated with the trace packet can be more fully examined. Exemplary events or conditions include, but are not limited to, errors, states, protocol transition, and the like or any combination thereof. The present invention enables software modules to trigger the protocol analyzer in situations where the protocol analyzer would not otherwise trigger. In one embodiment, the trace packet placed on the bus by a software module can be used for debugging purposes.

For clarity, the present invention is discussed in terms of the Universal Serial Buss (USB) protocol, but one of skill in the art will recognize that the present invention can be applied to other bus protocols, both serial and parallel. As used herein, "software module" refers to application code, device drivers, class drivers, custom drivers, stacks, and the like or any combination thereof.

Figure 1:
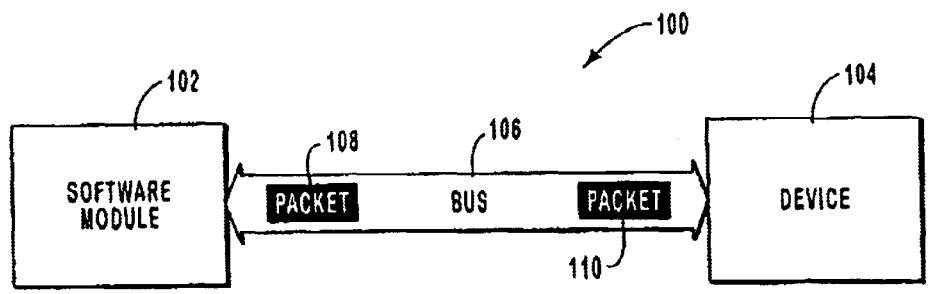
FIG. 1 is a block diagram illustrating the data packets that are communicated between a software module and a device driver over a bus.

FIG. 1 is a block diagram that illustrates communication between a software module and a device over a bus. Thus, a software module 102 communicates with a device 104 over a bus 106. The bus 106 can operate under various protocols including, but not limited to, IEEE 1394 and USB. The software module 102 generates a packet 108 that is sent to the device 104. In some embodiments, the software module 102 utilizes a driver stack to both send and receive packets over the bus 106. Similarly, the device 104 may transmit a packet 110 over the bus 106 to the software module 102. In one embodiment of the present invention, the software module 102 is a device driver that interacts with another low level driver or with the hardware directly.

Figure 2:
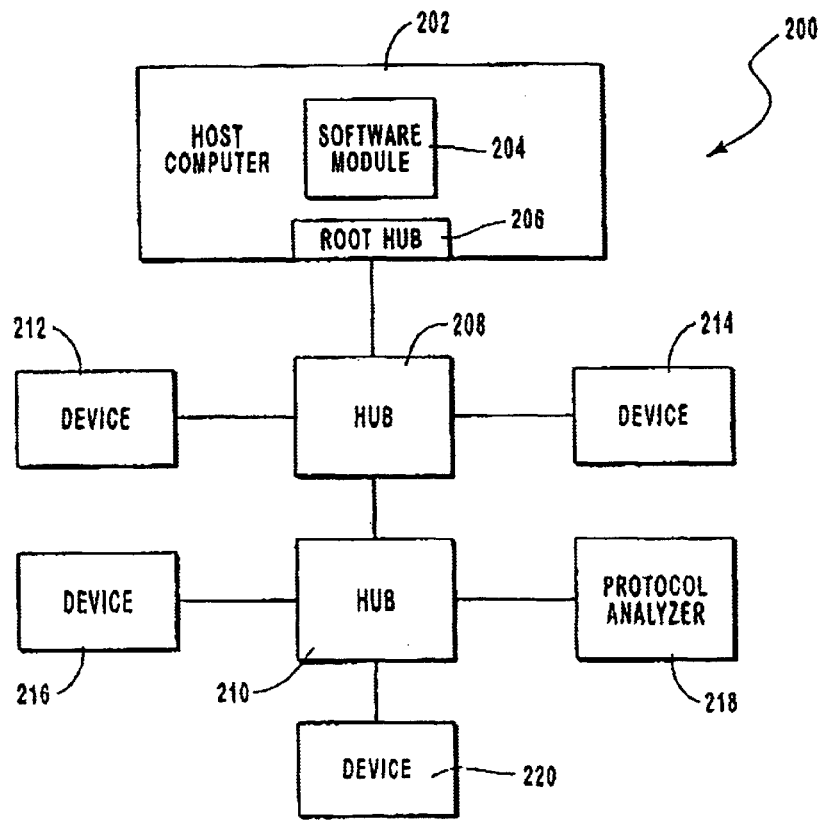
FIG. 2 is a block diagram illustrating the configuration of a serial bus and a protocol analyzer that is connected with the serial bus.

FIG. 2 further illustrates the connections and communications that exist between a host computer 202 and various devices using a USB bus. The host computer 202 includes a root hub 206 that can be used to connect, in one embodiment, 127 devices. Each hardware item connected to the root hub 206 is considered a device. Thus, the hub 208 and the hub 210 are considered devices. Each hub 208 and 210, however, provide additional ports that can be used to connect additional devices. In this example, the device 214 and 212 are connected with the hub 208, while the device 216 and 220 are connected to the hub 210. The hub 210 is connected with the hub 208, which is connected with the root hub 206.

A software module 204 is present at the host computer 202 and is typically associated with a particular device. For example, each device typically has a device driver loaded at the host computer 202 in addition to any application software that can be used in conjunction with the device. Typically, a software module is usually only able to communicate with a particular device connected to the USB bus system. A printer driver, for example, can only communicate with a printer.

FIG. 2 also illustrates a protocol analyzer 218 that is connected to the USB bus through the hub 210. The protocol analyzer 218 can monitor the data or traffic on the bus and capture the data when a trigger event occurs or is detected. For example, when an error occurs in the bus protocol, the protocol analyzer 218 can detect this error and trigger. As a result, the protocol analyzer 218 captures the information that was on the bus when the protocol error was detected. As previously described, the captured data can relate to time periods before and/or after the trigger event. The data captured depends on the configuration of the protocol analyzer.

Even though protocol analyzers are capable of capturing the data flowing on a bus as described above, there are situations where the protocol analyzer does not trigger. However, there are situations where an error or other problem occurs, but the protocol analyzer does not trigger because the data flowing on the bus does not include an event or condition that would otherwise cause the protocol analyzer to trigger. In other words, some of the errors that occur in a system are not reflected by the events that the protocol analyzer is able to detect. The present invention enables software modules to cause the protocol analyzer to trigger and begin capturing data. Alternatively, the software modules can cause the protocol analyzer to dump the contents of a moving window when triggered. The data captured when the protocol analyzer triggers depends on the configuration of the protocol analyzer as previously described.

Figure 3:
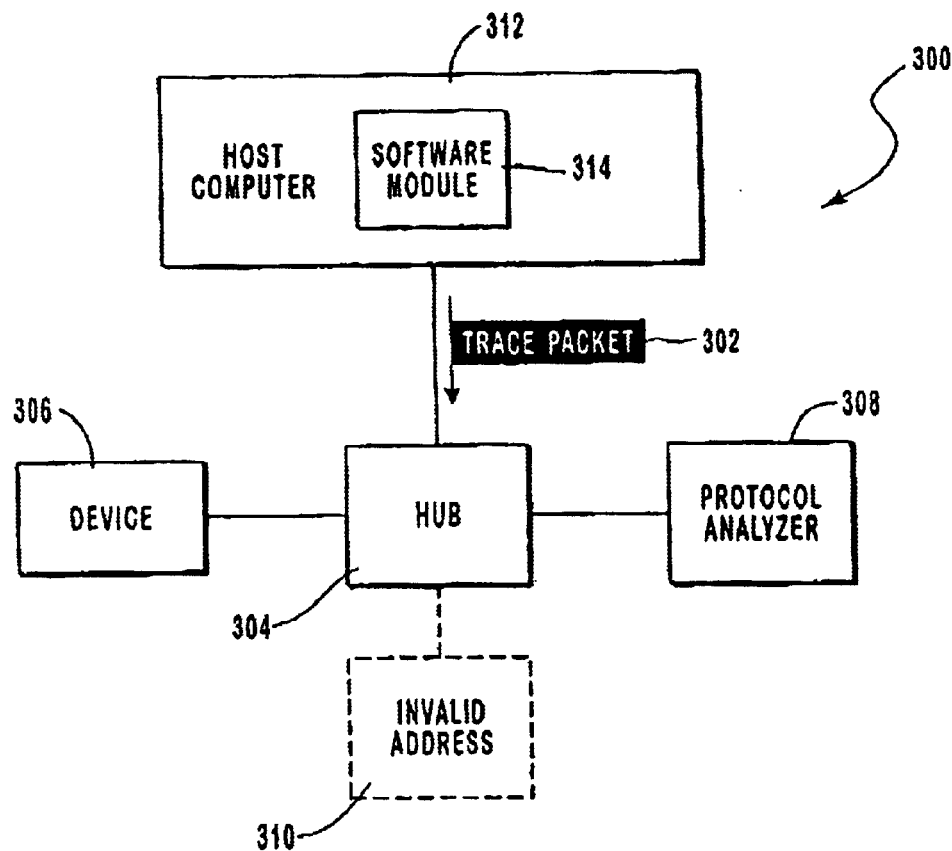
FIG. 3 is a block diagram that illustrates a software module generating a data packet that triggers a protocol analyzer.

FIG. 3 illustrates an exemplary system for implementing the present invention. The host computer 312 typically has a software module 314 loaded. The software module 314, as previously described, can be a device driver or other module and the software module 314 is typically in communication with a device 306. Thus, the packets generated and sent by the software module 314 are intended for the device 306 and the software module 314 is precluded from sending packets to other devices. For example, the device 306 may be a mouse, a keyboard, a printer or other device, and the software module 314 would respectively be a mouse driver, a keyboard driver, a printer driver, or other device driver.

In the example of FIG. 3, the device 306 and the protocol analyzer are connected to a hub 304. When the software module 314 detects an error or other problem with the device 306, the software module 314 can generate a trace packet 302 that is sent out on the bus. The trace packet 302 is typically sent to an invalid address 310 (such as the root hub address) such that the trace packet 302 does not interfere with other devices that are on the bus. In other words, other devices, including the device 306, will ignore the trace packet 302. The trace packet 306 will typically have a known content that is typically benign. The present invention thus enables the software module 314 to send a packet to an address other than the address of the associated device 306.

In one embodiment, sending the trace packet 302 on the bus can be achieved by allowing the software module 314 to issue a call to lower level drivers that generate and send the trace packet to the invalid address 310. In the case of USB, the software module 314 may issue a call to a USB Parent driver, a USB hub driver, or other driver in the USB driver stack. One of the drivers in the USB driver stack then causes the trace packet to be generated and placed on the bus to the invalid address 310.

In general, the software module 314 can cause the trace packet 302 to be sent to the invalid address 310. In addition, any software module, including upper layer software layers and/or lower level device drivers, can generate and send the trace packet 302 when an error or problem is detected. Thus, the trace packet 302 may be generated and sent by a software module that is not directly involved with the software module/device combination that is experiencing difficulty. After the trace packet 302 is sent, the protocol analyzer 308 detects the trace packet 302 and triggers.

Figure 4:
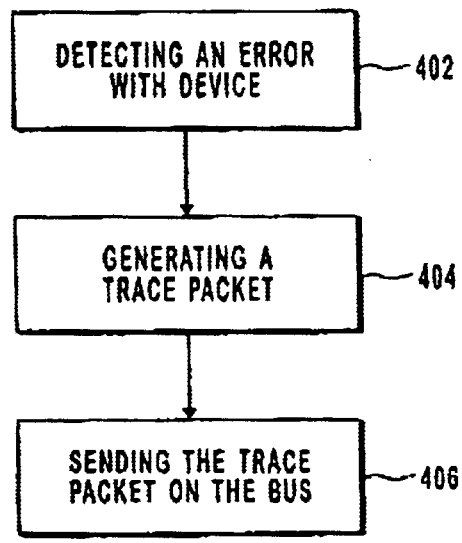
FIG. 4 is a flow diagram of an exemplary method for analyzing serial bus traffic.

FIG. 4 is a flow diagram illustrating an exemplary method for analyzing traffic or data on a bus. The method begins by detecting an error or other problem with a device (402). As previously mentioned, the error is typically detected by a software module and the software module is thus able to generate a trace packet (404) and send the trace packet over the bus (406). This is advantageous because there may not be a problem with the bus that would otherwise trigger the protocol analyzer. By generating and sending a trace packet over the bus, the software module is able to trigger the protocol analyzer and capture the traffic or data that is flowing on the bus when the error or problem is detected by the software module. The software module can cause the trace packet to be sent synchronously on the bus. The protocol analyzer can be externally triggered without requiring an external interface to the device.

The ability to generate a trace packet that will trigger a protocol analyzer is also advantageous as the trace packet enables users to debug their devices more quickly. The present invention enables the capture of detailed traces of the bus data at a time when the software module has detected an error or problem when there is nothing abnormal to search for the in the regular bus trace.

For example, the present invention can be used to detect and analyze random problems that may occur during device enumeration. During enumeration, the host will send various requests to the device in order to determine more information about the device. Based on the responses received from the device, the host will determine the best device driver for the device. The device driver then assumes control of the device and prepares the device for use by the host computer.

In this scenario, a problem may occur in the communication between the host and the device or between the device driver and the device. When a problem or error is detected, a software module (either the device driver or hub driver, for example) sends a trace packet over the bus to trigger the protocol analyzer. The data flowing on the bus is captured even though there is not problem or other error in the protocol of the bus. By capturing this data, the error than occurred during enumeration can be more easily analyzed and corrected.

The trace packet that is sent at the behest of a software module is not limited to situations where a problem is detected. The software module can cause a trace packet to be sent at any time. In some situations, the trace packet is sent periodically and the data thus captured can be used to improve performance of the host computer and/or device, for example.

The present invention extends to both systems and methods for analyzing bus data and to triggering a protocol analyzer with a trace packet generated by a software module. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 5. The logical connections depicted in FIG. 5 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system that includes a bus used for communication between a host computer and one or more devices, a method for a software module to trigger a protocol analyzer to capture data on the bus when a protocol of the bus is functioning properly, the method comprising:

detecting a condition with a device;

causing a trace packet to be generated, wherein the trace packet is known to the protocol analyzer;

sending the trace packet on the bus to an invalid address, wherein the trace packet triggers the protocol analyzer such that data on the bus is captured.

2. A method as defined in claim 1, wherein detecting an error with a device further comprises detecting an error with a device during enumeration of the device.

3. A method as defined in claim 1, wherein detecting an error with a device further comprises receiving no response from the device.

4. A method as defined in claim 1, wherein sending the trace packet on the bus to the invalid address further comprises synchronously transmitting the trace packet on the bus such that the protocol analyzer is externally triggered without requiring an external interface to the device.

5. A method as defined in claim 1, wherein sending the trace packet on the bus to the invalid address further comprises sending the trace packet on the bus periodically even if an error is not detected.

6. A method as defined in claim 1, wherein sending the trace packet on the bus further comprises one of: sending the trace packet on a Universal Serial Bus; and sending the trace packet on an IEEE 1394 bus.

7. A method as defined in claim 6, wherein the invalid address is a root hub address.

8. A method as defined in claim 1, wherein generating a trace packet further comprises:

receiving a call at a low level device driver from the software module;

generating the trace packet by the low level device driver; and placing the trace packet on the bus.

9. A method as defined in claim 1, wherein detecting a condition with a device further comprises at least one of:

detecting an error with the device;

detecting a state with the device; and detecting a protocol transition.

10. A method as defined in claim 9, wherein sending the trace packet on the bus to the invalid address further comprises synchronously transmitting the trace packet on the bus such that the protocol analyzer is externally triggered without requiring an external interface to the device.

11. In a system that includes a bus used for communication between a host computer and one or more devices, wherein a protocol analyzer captures communication between the host and the one or more devices when triggered, a method for triggering the protocol analyzer to capture the communication, the method comprising:

receiving a call, at a device driver, from an upper layer software module, wherein the upper layer software module has detected a problem with a particular device;

generating a trace packet in response to the call from the upper layer software module, wherein the trace packet has been previously identified to the protocol analyzer;

sending the trace packet on the bus to an invalid address, wherein the protocol analyzer triggers upon detecting the trace packet.

12. A method as defined in claim 11, wherein the device driver is a low lever device driver in a driver stack.

13. A method as defined in claim 11, wherein the device driver is one of: a hub driver and a host controller driver.

14. A method as defined in claim 11, wherein receiving a call further comprises detecting an error with a device.

15. A method as defined in claim 11, further comprising periodically sending the trace packet on the bus to the invalid address.

16. A method as defined in claim 11, wherein sending the trace packet on the bus to an invalid address, wherein the protocol analyzer triggers upon detecting the trace packet further comprises one of:

causing the protocol analyzer to begin capturing data on the bus; and causing the protocol analyzer to stop capturing data on the bus such that recent events prior to the trace packet are stored in a cache of the protocol analyzer.

17. A computer program product having computer executable instructions for performing the method of claim 11.

18. In a system that includes a bus used for communication between a host computer and one or more devices, a computer program product for implementing a method for a software module to trigger a protocol analyzer to capture data on the bus when a protocol of the bus is functioning properly, the computer program product comprising:

a computer readable medium having computer executable instructions for performing the method, the method comprising:

detecting an error with a device;

generating a trace packet;

sending the trace packet on the bus to an invalid address, wherein the trace packet triggers the protocol analyzer such that data on the bus is captured.

19. A computer program product as defined in claim 18, wherein detecting an error with a device further comprises detecting an error with a device during enumeration of the device.

20. A computer program product as defined in claim 18, wherein detecting an error with a device further comprises receiving no response from the device.

21. A computer program product as defined in claim 18, wherein generating a trace packet further comprises placing data in the packet that is known.

22. A computer program product as defined in claim 18, wherein sending the trace packet on the bus to the invalid address further comprises synchronously transmitting the trace packet on the bus such that the protocol analyzer is externally triggered without requiring an external interface to the device.

23. A computer program product as defined in claim 18, wherein sending the trace packet on the bus to the invalid address further comprises sending the trace packet on the bus periodically even if an error is not detected.

24. A computer program product as defined in claim 18, wherein sending the trace packet on the bus further comprises one of: sending the trace packet on a Universal Serial Bus; and sending the trace packet on an IEEE 1394 bus.

25. A computer program product as defined in claim 18, wherein generating a trace packet further comprises:

receiving a call at a low level device driver from the software module;

generating the trace packet by the low level device driver; and placing the trace packet on the bus.

* * * * *

UNITED STATES PATENT AND TRADEMARK OFFICE
CERTIFICATE OF CORRECTION

| | |
|---|---|
| PATENT NO. | : 7,020,801 B2 |
| APPLICATION NO. | : 10/164441 |
| DATED | : March 28, 2006 |
| INVENTOR(S) | : John Charles Dunn et al. |

It is certified that error appears in the above-identified patent and that said Letters Patent is hereby corrected as shown below:

Title Page
Item 75, Inventors, change "John Charles Dun" to --John Charles Dunn--

Signed and Sealed this

Seventeenth Day of October, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,020,801 B2 |
| APPLICATION NO. | : 10/164441 |
| DATED | : March 28, 2006 |
| INVENTOR(S) | : Dun et al. |

Page 1 of 1

It is certified that error appears in the above-identified patent and that said Letters Patent is hereby corrected as shown below:

In column 9, line 23, in Claim 12, delete "lever" and insert -- level --, therefor.

Signed and Sealed this

Sixth Day of April, 2010

David J. Kappos
*Director of the United States Patent and Trademark Office*